(12) United States Patent
Ding et al.

(10) Patent No.: US 8,922,880 B2
(45) Date of Patent: Dec. 30, 2014

(54) METHOD, APPARATUS, AND SYSTEM FOR AMPLIFYING A BURST OPTICAL SIGNAL

(75) Inventors: Feng Ding, Shenzhen (CN); Hong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 13/489,110

(22) Filed: Jun. 5, 2012

(65) Prior Publication Data

US 2012/0243076 A1    Sep. 27, 2012

Related U.S. Application Data

(63) Continuation of application No. PCT/CN2011/070406, filed on Jan. 20, 2011.

(30) Foreign Application Priority Data

Jan. 22, 2010    (CN) .......................... 2010 1 0103726

(51) Int. Cl.
  *H04B 10/296*    (2013.01)
  *H04B 10/293*    (2013.01)
  *H01S 3/16*    (2006.01)
  *H01S 3/067*    (2006.01)
  *H01S 3/10*    (2006.01)

(52) U.S. Cl.
  CPC .......... *H04B 10/296* (2013.01); *H04B 10/2931* (2013.01); *H01S 3/1613* (2013.01); *H01S 3/1608* (2013.01); *H01S 3/1616* (2013.01); *H01S 3/06754* (2013.01); *H01S 3/10015* (2013.01)
  USPC .................................................... 359/341.43

(58) Field of Classification Search
  USPC ...................................................... 359/341.43
  See application file for complete search history.

(56) References Cited

U.S. PATENT DOCUMENTS 5,467,219 A * 11/1995 Ushirozawa ............. 359/341.43
5,479,423 A * 12/1995 Tanikawa ........................ 372/26
5,589,975 A * 12/1996 Nakamura et al. ............. 359/345

(Continued)

FOREIGN PATENT DOCUMENTS

CN    101350670 A    1/2009
EP    1942565 A2    7/2008

OTHER PUBLICATIONS

International Search Report in corresponding International Patent Application No. PCT/CN2011/070406 (Apr. 21, 2011).

(Continued)

*Primary Examiner* — Ari M Diacou
(74) *Attorney, Agent, or Firm* — Leydig, Voit & Mayer, Ltd.

(57) ABSTRACT

Embodiments of the present invention disclose a method, an apparatus, and a system for amplifying a burst optical signal. The method includes: monitoring an input status of a signal light; when no signal light is input, controlling output power of a pump light so that a gain medium has output optical power and the output optical power is less than a maximum optical power that the gain medium is capable of outputting when a signal light is input; inputting the pump light into a wavelength division multiplexer so that the wavelength division multiplexer combines the signal light and the pump light and inputs the combined light into the gain medium. With the preceding manners, when no signal light is input, the power of the pump light is controlled.

13 Claims, 3 Drawing Sheets

(56) References Cited

U.S. PATENT DOCUMENTS

| | | | |
|---|---|---|---|
| 5,633,749 A * | 5/1997 | Shibuya | 359/341.43 |
| 5,809,049 A * | 9/1998 | Schaefer et al. | 372/38.02 |
| 5,812,710 A * | 9/1998 | Sugaya | 385/27 |
| 5,859,716 A * | 1/1999 | O'Sullivan et al. | 398/17 |
| 6,025,947 A * | 2/2000 | Sugaya et al. | 398/97 |
| 6,038,063 A * | 3/2000 | Tsuda et al. | 359/341.41 |
| 6,151,158 A * | 11/2000 | Takeda et al. | 359/337.12 |
| 6,633,429 B2 * | 10/2003 | Kinoshita et al. | 359/337.1 |
| 2001/0008459 A1 * | 7/2001 | Ohshima et al. | 359/341.44 |
| 2001/0017729 A1 * | 8/2001 | Sugaya et al. | 359/341.41 |
| 2001/0050805 A1 * | 12/2001 | Ohshima et al. | 359/341.3 |
| 2002/0021488 A1 * | 2/2002 | Sugawara | 359/337.11 |
| 2002/0097484 A1 | 7/2002 | Shiozaki et al. | |
| 2002/0191279 A1 * | 12/2002 | DeCusatis et al. | 359/341.41 |
| 2003/0067647 A1 * | 4/2003 | Wan et al. | 359/124 |
| 2004/0042066 A1 * | 3/2004 | Kinoshita et al. | 359/341.41 |
| 2004/0114215 A1 * | 6/2004 | Tian et al. | 359/341.41 |
| 2004/0190125 A1 * | 9/2004 | Onaka et al. | 359/341.3 |
| 2006/0093357 A1 | 5/2006 | Park et al. | |
| 2008/0137179 A1 * | 6/2008 | Li et al. | 359/337.13 |
| 2009/0226188 A1 | 9/2009 | Komatsu | |
| 2012/0057876 A1 | 3/2012 | Liu et al. | |

OTHER PUBLICATIONS

Extended European Search Report in corresponding European Patent Application No. 11734370.7 (Jan. 7, 2013).

Written Opinion of the International Searching Authority in corresponding PCT Patent Application No. PCT/CN2011/070406 (Apr. 21, 2011).

\* cited by examiner

METHOD, APPARATUS, AND SYSTEM FOR AMPLIFYING A BURST OPTICAL SIGNAL

CROSS-REFERENCE TO RELATED APPLICATIONS

This application is a continuation of International Patent Application No. PCT/CN2011/070406, filed on Jan. 20, 2011, which claims priority to Chinese Patent Application No. 201010103726.X, filed on Jan. 22, 2010, both of which are hereby incorporated by reference in their entireties.

FIELD OF THE INVENTION

The present invention relates to the field of optical communications technologies, and in particular, to a method, an apparatus, and a system for amplifying a burst optical signal.

BACKGROUND OF THE INVENTION

In an optical communication network, there is a type of signal light that is formed from different optical signal packets in time. Time of each optical signal packet is inconsecutive and a particular time interval without a light exists. Power amplitude between two adjacent optical signal packets may be inconsecutive. It is called a burst optical signal. At present, the burst optical signal exists in an optical switching system that is formed from an optical packet switching (OPS) technology or an optical burst switching (OBS) technology and a passive optical network (PON) system of an access network. A device, an instrument, or a system that generates this type of burst optical signal is uniformly called an optical burst signal source. Conventionally, the optical burst signal source includes an optical burst transmitter, an optical burst switch, and so on.

Signal optical power of the burst optical signal is gradually attenuated with an increase of a transmission distance in an optical fiber. To extend the transmission distance of the optical signal, amplification needs to be performed on the optical signal; or, when the burst optical signal passes through an optical component, the signal optical power is attenuated due to an insertion loss of the optical component, and in this case, amplification also needs to be performed on the optical signal. A preferred solution is to use an optical amplifier (a burst optical amplifier) that supports the burst optical signal. An existing optical amplifier is implemented by using a solution of automatic power control (APC) that is also called constant power control. In this solution, output optical power of the optical amplifier is a fixed value, which is specifically as follows: An optical detector is used to monitor intensity of an amplified signal light; when the intensity of the signal light is smaller than the fixed value, a pump source is controlled to increase power of a generated pump light; when the intensity of the signal light is greater than the fixed value, the pump source is controlled to adjust the power of the generated pump light; the pump light and the signal light are input into a wavelength division multiplexer (WDM); the WDM combines the input signal light and pump light and then inputs the combined light into a gain medium; the gain medium absorbs energy provided by the pump light to enable electrons to jump to a high energy level and generate population inversion; a signal photon triggers these activated electrons through a stimulated radiation process and enable the electrons to jump to a lower energy level; in this way, an amplified signal is generated and the amplification of the signal light is implemented.

During the implementation of the present invention, the inventor discovers that: Because the output optical power needs to be kept in a constant state, when no signal light is input, the optical amplifier may drive the pump source to output a pump light with large power so that optical power of amplified spontaneous emission (ASE) generated by the gain medium is equal to the output optical power of the fixed value. In this case, the power of the pump light is higher than that when a signal light is input. In a process from the situation where no signal light is input to the situation where a signal light is input, a serious gain overshoot surge lasting tens of microseconds is caused because the power of the pump light at this time is higher than that when a signal light is input, which causes severe damage on a transmission signal and distortion of the optical signal.

SUMMARY OF THE INVENTION

A technical issue to be resolved by the embodiments of the present invention is to provide a method, an apparatus, and a system for amplifying a burst optical signal to implement fidelity of the burst optical signal in the amplification process.

To resolve the preceding technical issue, an embodiment of a method for amplifying a burst optical signal according to the present invention may be implemented through the following technical solutions:

monitoring an input status of a signal light;

when no signal light is input, controlling output power of a pump light so that a gain medium has output optical power and the output optical power is less than a maximum optical power that the gain medium is capable of outputting when a signal light is input; and inputting the pump light into a wavelength division multiplexer so that the wavelength division multiplexer combines the signal light and the pump light and then inputs the combined light into the gain medium.

A burst optical amplifier includes:

a monitoring unit, configured to monitor an input status of a signal light; and a pump source, configured to generate a pump light; when no signal light is input, control output power of the pump light so that gain medium has output optical power and the output optical power is less than a maximum optical power that the gain medium is capable of outputting when a signal light is input; and input the pump light into a wavelength division multiplexer.

An optical communication system includes any type of burst optical amplifier provided by the embodiments of the present invention, where the burst optical amplifier connects to an optical burst signal source and a burst optical receiver through optical fibers and the burst optical amplifier is configured to receive, through an optical fiber, a burst optical signal generated by the optical signal source, amplify the burst optical signal, and then send the amplified burst optical signal to the burst optical receiver through an optical fiber.

The preceding technical solutions have the following beneficial effects: When no signal light is input, the power of the pump light is controlled, which improves a transient response speed of the optical amplifier, avoids a surge, migrates a problem of a low startup of the optical amplifier, and implements the fidelity of the burst optical signal in the amplification process.

BRIEF DESCRIPTION OF THE DRAWINGS

To make the technical solutions in the embodiments of the present invention clearer, the following briefly describes the accompanying drawings involved in the description of the embodiments of the present invention. Apparently, the accompanying drawings described below are merely some embodiments of the present invention. A person skilled in the art can derive other accompanying drawings from these accompanying drawings without any creative effort.

DETAILED DESCRIPTION OF THE EMBODIMENTS

The following clearly and completely describes the technical solutions in the embodiments of the present invention with reference to the accompanying drawings in the embodiments of the present invention. Evidently, the described embodiments are merely a part of the embodiments of the present invention rather than all embodiments. All other embodiments obtained by a person skilled in the art based on the embodiments in the present invention without any creative effort shall fall within the protection scope of the present invention.

Figure 1:
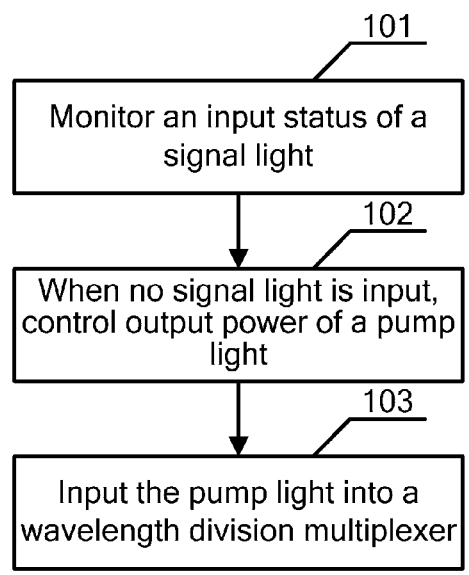
FIG. 1 is a schematic flow chart of a method according to a first embodiment of the present invention.

Embodiment 1, as shown in FIG. 1, this embodiment of the present invention provides a method for amplifying a burst optical signal, including:

101: Monitor an input status of a signal light.

A monitoring manner may be monitoring whether a signal light is input by using an optical detector. Definitely, power of the input signal light may further be monitored, which is not restricted in this embodiment of the present invention. In addition, a manner of monitoring whether a signal light is input is not restricted in this embodiment of the present invention.

102: When no signal light is input, control output power of a pump light so that a gain medium has output optical power and the output optical power is less than a maximum optical power that the gain medium is capable of outputting when a signal light is input.

Before the pump light generated by a pump source is controlled, the power of the pump light may be constant or variable, which is not restricted in this embodiment.

A solution for implementing 102 may be as follows: Input the pump light generated by the pump source into a variable optical attenuator (Variable Optical Attenuator, VOA) and adjust an attenuation value of the variable optical attenuator so that the gain medium has the output optical power and the output optical power is less than the maximum optical power that the gain medium is capable of outputting when a signal light is input; and may also be as follows: Adjust a work current of the pump source so that the gain medium has the output optical power and the output optical power is less than the maximum optical power that the gain medium is capable of outputting when a signal light is input. In a subsequent apparatus embodiment, these two manners are specifically described. It should be noted that the preceding two manners are merely two examples for controlling the power of the pump light rather than exhaustion and therefore shall not be construed as a restriction on the present invention. The input signal light may be single-wavelength or multi-wavelength, which is not restricted in this embodiment of the present invention.

According to a test result, when no signal light is input, the power of the generated pump light may be 4 dB or more than 4 dB lower than the maximum power of the pump light when a signal light is input, which is capable of achieving a good effect.

The preceding is the situation where no signal light is input. When a signal light exists, the generating the preceding pump light includes: generating a pump light with power that corresponds to power of the input signal light, which may specifically be implemented by referring to any one of the following solutions: automatic gain control (Automatic Gain Control, AGC), automatic current control (Automatic Current Control, ACC), and automatic power control (Automatic Power Control, APC).

103: Input the pump light into a wavelength division multiplexer so that the wavelength division multiplexer combines the signal light and the pump light and then inputs the combined light into the gain medium.

The gain medium may be any one of the following: an erbium-doped fiber, a planar erbium-doped waveguide, a praseodymium-doped fiber, and a thulium-doped fiber. It may be understood that the preceding example of the gain medium is not exhaustion of the gain medium and therefore shall not be construed as a restriction on this embodiment of the present invention.

In the technical solution according to the first embodiment, when no signal light is input, the power of the pump light is controlled, which increases a transient response speed of an optical amplifier, avoids a surge, mitigates a problem of a low startup of the optical amplifier, and implements fidelity of the burst optical signal in the amplification process.

Figure 2:
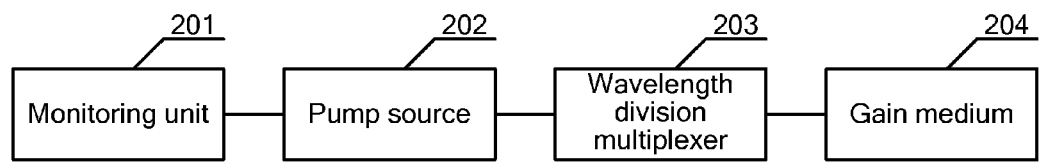
FIG. 2 is a schematic structural diagram of a burst optical amplifier according to a second embodiment of the present invention.

Embodiment 2, as shown in FIG. 2, this embodiment of the present invention further provides a burst optical amplifier, including:

a monitoring unit 201, configured to monitor an input status of a signal light;

a pump source 202, configured to generate a pump light; when no signal light is input, control output power of the pump light so that a gain medium has output optical power and the output optical power is less than a maximum optical power that the gain medium is capable of outputting when a signal light is input; and input the pump light into a wavelength division multiplexer;

a wavelength division multiplexer 203, configured to combine the signal light and the pump light and then input the combined light into the gain medium; and a gain medium 204, configured to amplify and then output the input signal light.

Figure 3:
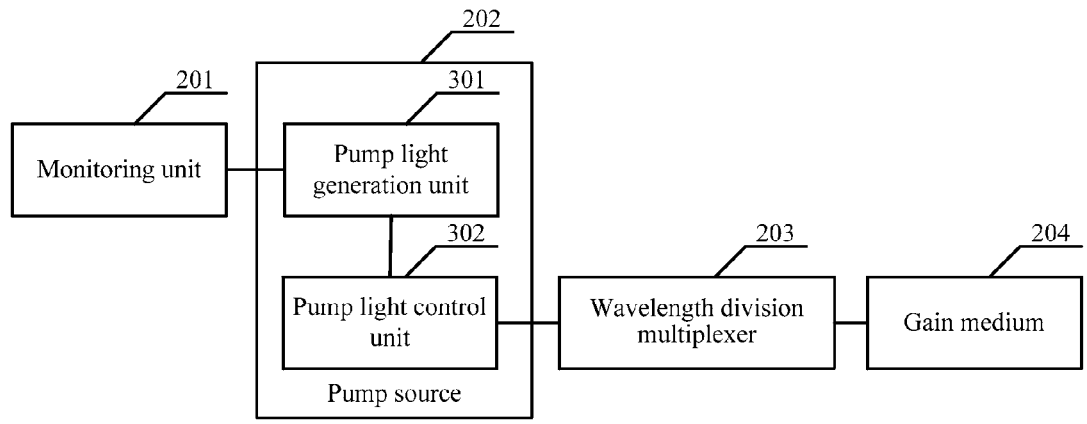
FIG. 3 is a schematic structural diagram of a burst optical amplifier according to the second embodiment of the present invention.

Optionally, as shown in FIG. 3, the pump source 202 includes:

a pump light generation unit 301, configured to generate a pump light and send the pump light to a pump light control unit; and a pump light control unit 302, configured, when no signal light is input, to adjust an attenuation value of a variable optical attenuator so that the gain medium has the output optical power and the output optical power is less than the maximum optical power that the gain medium is capable of outputting when a signal light is input, and input the attenuated pump light into the wavelength division multiplexer.

Figure 4:
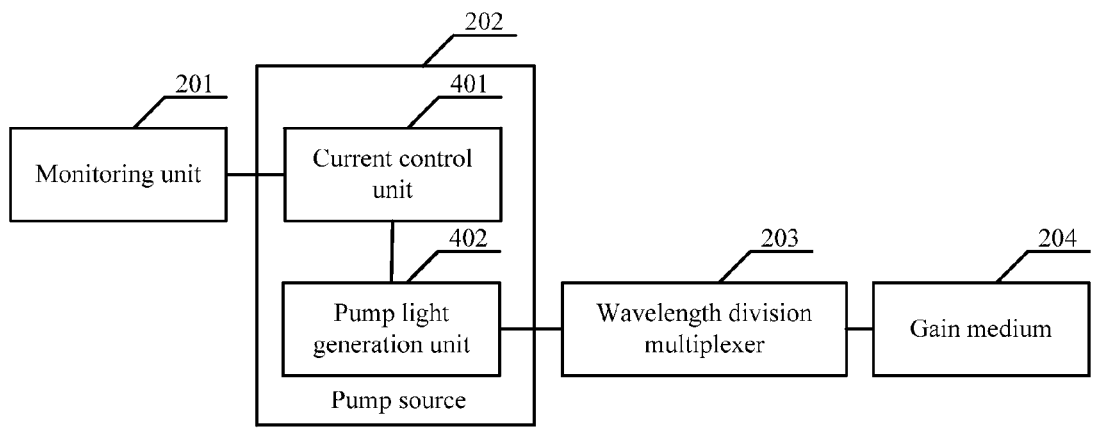
FIG. 4 is a schematic structural diagram of a burst optical amplifier according to the second embodiment of the present invention.

Optionally, as shown in FIG. 4, the pump source 202 includes:

a current control unit 401, configured to adjust a work current of a pump light generation unit 402 when no signal light is input; and a pump light generation unit 402, configured to generate a pump light under the work current controlled by current control unit 401 and input the generated pump light into the wavelength division multiplexer.

Further, the pump source 202 is further configured to generate a pump light with power that corresponds to power of the input signal light.

Specifically, the gain medium is any one of the following: an erbium-doped fiber, a planar erbium-doped waveguide, a praseodymium-doped fiber, and a thulium-doped fiber.

Figure 5:
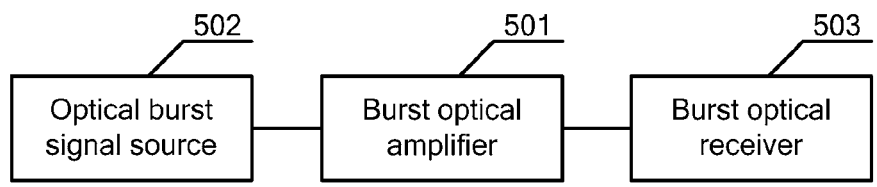
FIG. 5 is a schematic structural diagram of an optical communication system according to a third embodiment of the present invention.

Embodiment 3, as shown in FIG. 5, this embodiment of the present invention further provides an optical communication system, including: any type of burst optical amplifier 501 in the second embodiment, where the burst optical amplifier 501 connects to an optical burst signal source 502 and a burst optical receiver 503 through optical fibers.

The burst optical amplifier 501 is configured to receive, through an optical fiber, a burst optical signal generated by the optical burst signal source 502, amplify the burst optical signal, and then send the amplified burst optical signal to the burst optical receiver 503.

The optical communication system may be an optical communication system that uses the burst optical amplifier, for example, a passive optical network (Passive Optical Network, PON), an optical burst switching (Optical Burst Switching, OBS) network, and an optical packet switching (Optical Packet Switching, OPS) network. The preceding examples shall not be construed as exhaustion of the optical communication system that uses the burst optical amplifier, and therefore shall not be construed as a restriction on the optical communication system in this embodiment.

In the technical solutions according to the second embodiment and the third embodiment, when no signal light is input, the power of the pump light is controlled, which increases a transient response speed of the optical amplifier, avoids a surge, mitigates a problem of a low startup of the optical amplifier, and implements fidelity of the burst optical signal in the amplification process.

Embodiment 4, in this embodiment, using a solution of controlling a work current of a pump source and using a solution of a variable optical attenuator are taken as examples to further describes a burst optical amplifier provided in this embodiment of the present invention.

Figure 6:
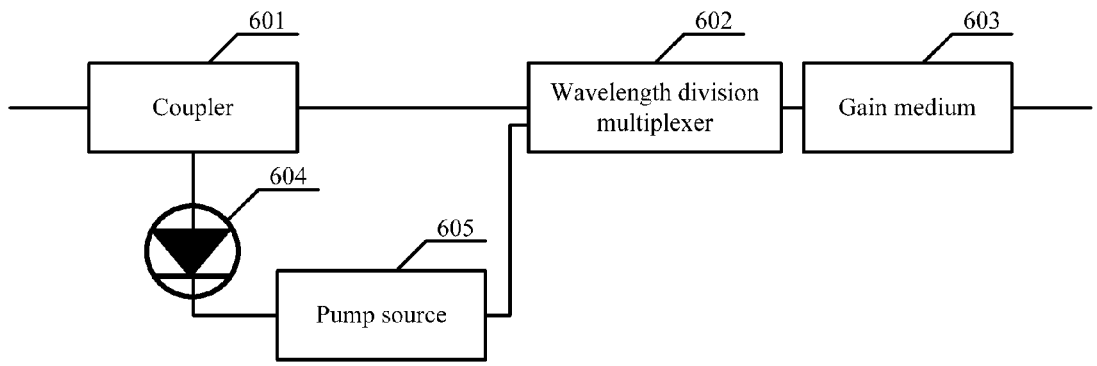
FIG. 6 is a schematic structural diagram of a burst optical amplifier according to a fourth embodiment of the present invention.

A burst optical amplifier shown in FIG. 6 is a burst optical amplifier that uses the solution of controlling the work current of the pump source, including: a coupler 601, a wavelength division multiplexer 602, a gain medium 603, an optical detector 604, and a pump source 605.

An input end of the coupler 601 connects to a transmission optical fiber over which a signal light enters the burst optical amplifier and an output end connects to the wavelength division multiplexer 602 and the optical detector 604; an input end of the optical detector 604 connects to the coupler 601 and an output end connects to the pump source 605; an input end of the pump source 605 connects to the detector 604 and an output end connects to the wavelength division multiplexer 602; an input end of the wavelength division multiplexer 602 connects to the coupler 601 and the pump source 605 and an output end connects to the gain medium 603; an input end of the gain medium 603 connects to the wavelength division multiplexer 602 and an output end connects to a transmission optical fiber over which the signal light goes out of the burst optical amplifier.

The coupler 601 is configured to split a small part of signal lights from signal lights that enter the coupler 601 into the optical detector 604 (definitely, if no signal light exists, no signal light is split to the optical detector 604). A remaining signal light is transmitted into the wavelength division multiplexer 602.

The optical detector 604 is configured to monitor whether a signal light exists and power of the signal light, and send a control signal to the pump source 605 based on the power of the signal light to control power of a pump light generated by the pump source 605; specifically: when the power of the signal light is low, control the pump source 605 for generating a pump light with low power, when the power of the signal light is high, control the pump source 605 for generating a pump light with high power, and when no signal light exists, control the pump source 605 for generating a pump light with power in a particular range so that the gain medium has output optical power and the output optical power is less than a maximum optical power that the gain medium is capable of outputting when a signal light is input and may be 4 dB or more than 4 dB lower than a maximum power that the optical amplifier outputs when a signal light is input. A specific control manner may be controlling the work current input into the pump source 605 based on a feature that the higher the work current is, the higher the power of the pump light is for implementation.

The pump source 605 is configured to generate a pump light under the work current and output the pump light to the wavelength division multiplexer 602.

The wavelength division multiplexer 602 is configured to combine the signal light and the pump light and then send the combined light into the gain medium 603.

The gain medium 603 is configured to amplify and then output the input signal light.

Figure 7:
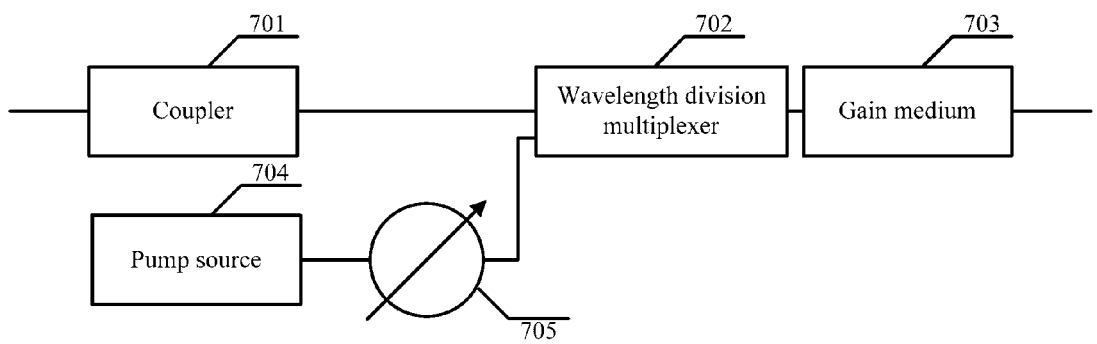
FIG. 7 is a schematic structural diagram of a burst optical amplifier according to the fourth embodiment of the present invention.

A burst optical amplifier shown in FIG. 7 is a burst optical amplifier that uses the solution of the variable optical attenuator, including: a coupler 701, a wavelength division multiplexer 702, a gain medium 703, a pump source 704, and a variable optical attenuator 705.

An input end of the coupler 701 connects to a transmission optical fiber over which a signal light enters the burst optical amplifier and an output end connects to the wavelength division multiplexer 702; an output end of the pump source 704 connects to the variable optical attenuator 705; an input end of the variable optical attenuator 705 connects to the pump source 704 and an output end connects to the wavelength division multiplexer 702; an input end of the wavelength division multiplexer 702 connects to the coupler 701 and the variable optical attenuator 705 and an output end connects to the gain medium 703.

The coupler 701 is configured to send the input signal light to the wavelength division multiplexer 702.

The pump source 704 is configured to generate a pump light with constant power and send the pump light to the variable optical attenuator 705.

The variable optical attenuator 705 is configured to attenuate a pump light input into the variable optical attenuator 705 and then transmit the attenuated pump light to the wavelength division multiplexer 702, where an attenuation value of the variable optical attenuator is adjusted when no signal light is input so that the gain medium has the output optical power and the output optical power is less than the maximum optical power that the gain medium is capable of outputting when a signal light is input.

The wavelength division multiplexer 702 is configured to combine the signal light and the pump light that are input into the wavelength division multiplexer 702 and send the combined light to the gain medium 703.

The gain medium 703 is configured to amplify and then output the input signal light.

In the technical solution according to the fourth embodiment, when no signal light is input, the power of the pump light is controlled, which increases a transient response speed of the optical amplifier, avoids a surge, migrates a problem of a low startup of the optical amplifier, and implements fidelity of the burst optical signal in the amplification process.

A person skilled in the art should understand that all or part of the steps of the methods provided in the preceding embodiments may be implemented by a program instructing relevant hardware. The program may be stored in a computer readable storage medium. The storage medium may be a Read Only Memory, a magnetic disk, a Compact Disc-Read Only Memory, and so on.

The preceding describes the method, the apparatus, and the system for amplifying a burst optical signal according to the embodiment of the present invention in detail. The document uses specific examples to illustrate the principles and implementation manners of the present invention. Descriptions in the preceding embodiments are only used to help understanding of the methods and core ideas of the present invention. In addition, a person skilled in the art may make various modifications on the specific implementation manners and application scopes based on the idea of the present invention. To sum up, content in this specification shall not be construed as a restriction on the present invention.

What is claimed is:

1. A method for amplifying a burst optical signal, comprising:
   detecting a power level of a signal light prior to being input into a gain medium;
   inputting a pump light into a wavelength division multiplexer so that the wavelength division multiplexer combines the signal light and the pump light and then inputs the combined light into the gain medium;
   when no signal light is input, controlling output power of the pump light so that the gain medium has output optical power and the output optical power is less than a maximum optical power that the gain medium outputs when the signal light is input; and
   when signal light is input, controlling output power of the pump light so that the pump light has power that corresponds to the detected power level of the input signal light.

2. The method according to claim 1, wherein: the controlling the output power of the pump light so that the gain medium has the output optical power and the output optical power is less than the maximum optical power that the gain medium is capable of outputting when the signal light is input, comprises:
   inputting the pump light output by a pump source into a variable optical attenuator and adjusting an attenuation value of the variable optical attenuator so that the gain medium has the output optical power and the output optical power is less than the maximum optical power that the gain medium is capable of outputting when the signal light is input.

3. The method according to claim 1, wherein the controlling the output power of the pump light so that the gain medium has the output optical power and the output optical power is less than the maximum optical power that the gain medium is capable of outputting when the signal light is input, comprises adjusting a work current of the pump source so that the gain medium has the output optical power and the output optical power is less than the maximum optical power that the gain medium is capable of outputting when the signal light is input.

4. The method according to claim 1, wherein: the gain medium is any one of the following: an erbium-doped fiber, a planar erbium-doped waveguide, a praseodymium-doped fiber, and a thulium-doped fiber.

5. The method according to claim 2, wherein: the gain medium is any one of the following: an erbium-doped fiber, a planar erbium-doped waveguide, a praseodymium-doped fiber, and a thulium-doped fiber.

6. The method according to claim 3, wherein: the gain medium is any one of the following: an erbium-doped fiber, a planar erbium-doped waveguide, a praseodymium-doped fiber, and a thulium-doped fiber.

7. A burst optical amplifier, comprising:
   a monitoring unit, configured to detect a power level of a signal light prior to being input into a gain medium;
   the gain medium, configured to amplify and then output an input light;
   a wavelength division multiplexer, configured to combine the signal light and a pump light and then input the combined light into the gain medium; and
   a pump source, configured to:
     generate the pump light;
     when no signal light is input, control output power of the pump light so that the gain medium has output optical power and the output optical power is less than a maximum optical power that the gain medium outputs when the signal light is input;
     when signal light is input, control output power of the pump light so that the pump light has power that corresponds to the detected power level of the input signal light; and
     input the pump light into a wavelength division multiplexer.

8. The burst optical amplifier according to claim 7, wherein the pump source comprises:
   a pump light generation unit, configured to generate a pump light and send the pump light to a pump light control unit; and
   the pump light control unit, configured to adjust an attenuation value of a variable optical attenuator when no signal light is input and input an attenuated pump light into the wavelength division multiplexer.

9. The burst optical amplifier according to claim 7, wherein the pump source comprises:
   a current control unit, configured to adjust a work current of a pump light generation unit when no signal light is input; and
   a pump light generation unit, configured to generate a pump light under the work current controlled by the current control unit and input the generated pump light into the wavelength division multiplexer.

10. The method according to claim 7, wherein: the gain medium is any one of the following: an erbium-doped fiber, a planar erbium-doped waveguide, a praseodymium-doped fiber, and a thulium-doped fiber.

11. The method according to claim 8, wherein: the gain medium is any one of the following: an erbium-doped fiber, a planar erbium-doped waveguide, a praseodymium-doped fiber, and a thulium-doped fiber.

12. The method according to claim 9, wherein: the gain medium is any one of the following: an erbium-doped fiber, a planar erbium-doped waveguide, a praseodymium-doped fiber, and a thulium-doped fiber.

13. An optical communication system, comprising: a burst optical amplifier, wherein the burst optical amplifier connects to an optical burst signal source and a burst optical receiver through optical fibers, and the burst optical amplifier is configured to receive, through an optical fiber, a burst optical signal generated by the optical signal source, amplify the burst optical signal, and then send the amplified burst optical signal to the burst optical receiver;

wherein the burst optical amplifier comprises:

a monitoring unit, configured detect a power level of a signal light prior to being input into a gain medium;

the gain medium, configured to amplify and then output an input light;

a wavelength division multiplexer, configured to combine the signal light and a pump light and then input the combined light into the gain medium; and a pump source, configured to:

generate the pump light;

when no signal light is input, control output power of the pump light so that the gain medium has output optical power and the output optical power is less than a maximum optical power that the gain medium outputs when the signal light is input;

when signal light is input, control output power of the pump light so that the pump light has power that corresponds to the detected power level of the input signal light; and input the pump light into a wavelength division multiplexer.

* * * * *